(12) United States Patent
Liao et al.

(10) Patent No.: US 9,575,344 B2
(45) Date of Patent: Feb. 21, 2017

(54) DISPLAY MODULE

(71) Applicant: AU Optronics Corporation, Hsin-Chu (TW)

(72) Inventors: Chien-Ting Liao, Hsin-Chu (TW); Chian-Hsing Huang, Hsin-Chu (TW); Po-Hung Chen, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 126 days.

(21) Appl. No.: 13/970,797

(22) Filed: Aug. 20, 2013

(65) Prior Publication Data

US 2014/0232967 A1   Aug. 21, 2014

(30) Foreign Application Priority Data

Feb. 18, 2013   (TW) .............................. 102105550 A

(51) Int. Cl.
*G02F 1/1335*   (2006.01)
*G02F 1/1333*   (2006.01)

(52) U.S. Cl.
CPC ............. *G02F 1/133308* (2013.01); *G02F 2001/133314* (2013.01)

(58) Field of Classification Search
CPC  G06F 1/1601; G06F 1/1616; G02F 1/133608; G02F 1/133308
See application file for complete search history.

(56) References Cited

U.S. PATENT DOCUMENTS

| | | | | |
|---|---|---|---|---|
| 5,264,992 A | * | 11/1993 | Hogdahl et al. | 361/679.17 |
| 5,455,746 A | * | 10/1995 | Sato | G06F 1/1616 |
| | | | | 174/17 R |
| 6,094,340 A | * | 7/2000 | Min | 361/679.22 |
| 6,587,166 B1 | * | 7/2003 | Lee et al. | 349/58 |
| 2012/0051089 A1 | * | 3/2012 | Park et al. | 362/611 |
| 2014/0226103 A1 | * | 8/2014 | Zhuang et al. | 349/58 |

FOREIGN PATENT DOCUMENTS

| | | |
|---|---|---|
| CN | 102445775 | 5/2012 |
| TW | 201101968 | 1/2011 |
| TW | I384297 | 2/2013 |

* cited by examiner

*Primary Examiner* — Edward Glick
*Assistant Examiner* — Anthony G Quash
(74) *Attorney, Agent, or Firm* — WPAT, PC; Justin King; Douglas A. Hosack

(57) ABSTRACT

A display module includes a panel frame, a display panel, a system frame, and a printed circuit board. The panel frame includes a baseplate having at least one edge, at least one sidewall located on the edge, at least one top wall adjacent to the sidewall, and a support element. An accommodating space is formed by the sidewall and the baseplate. The support element includes a first support portion and a second support portion connected to the first support portion. The support element extends from the edge of the baseplate toward the outside of the accommodating space. The display panel is disposed on the panel frame. The first support portion is disposed on the system frame. The printed circuit board is disposed on the second support portion.

16 Claims, 13 Drawing Sheets

DISPLAY MODULE

RELATED APPLICATIONS

This application claims priority to Taiwan Application Serial Number 102105550, filed Feb. 18, 2013, which is herein incorporated by reference.

BACKGROUND

Technical Field

The present disclosure relates to a display module.

Description of Related Art

A liquid crystal (LC) display device generally includes an LC panel, a light guide plate, a reflective plate, and a rear bezel. The rear bezel can support the LC panel, the light guide plate, or optical films. The rear bezel needs to have a high strength for supporting these components and thus is often made of metal. The rear bezel usually has at least two ear portions respectively assembled to a printed circuit board and a system rear cover.

In general, the ear portion for engaging with the printed circuit board and the other ear portion for engaging with the system rear cover are formed by punching and bending, and the ear portion for engaging with the printed circuit board and the ear portion for engaging with the system rear cover are connected to the printed circuit board and the system rear cover, respectively. That is, the ear portion for engaging with the printed circuit board is separated from the ear portion for engaging with the system rear cover. However, the assembly of the printed circuit board requires the ear portion for engaging with the printed circuit board, but the assembly of the system rear cover requires the ear portion for engaging with the system rear cover. As such, it is inconvenient for users to assemble the printed circuit board and the system rear cover to the rear bezel. Moreover, since the ear portion for engaging with the printed circuit board is separated from the ear portion for engaging with the system rear cover, the process time of punching and bending the ear portions is increased.

In addition, the rear bezel adjacent to the ear portions normally suffers insufficient strength, such that when the LC panel is assembled to the rear bezel, the ear portions may be subjected to deformation from external forces so as to break the LC panel.

SUMMARY

An aspect of the present invention is to provide a display module.

According to an embodiment of the present invention, a display module includes a system frame, a panel frame, a display panel, and a printed circuit board. The panel frame includes a baseplate, at least one sidewall, at least one top wall, and a support element. The baseplate has at least one edge. The sidewall is located on the edge. An accommodating space is formed by the sidewall and the baseplate. The top wall is adjacent to the sidewall. A groove is formed between the top wall and the baseplate. The support element extends from the edge toward the outside of the accommodating space. The support element includes a first support portion and a second support portion connected to the first support portion. The first support portion is disposed on the system frame. The display panel is disposed on the panel frame. The printed circuit board is disposed on the second support portion.

Another aspect of the present invention is to provide a display module.

According to an embodiment of the present invention, a display module includes a system frame, a panel frame, a display panel, and a printed circuit board. The panel frame includes a baseplate, at least one sidewall, at least one top wall, and a support element. The baseplate has at least one edge. The sidewall is located on the edge. An accommodating space is formed by the sidewall and the baseplate. The top wall is adjacent to the sidewall. A groove is formed between the top wall and the baseplate. The support element includes a first support portion and a second support portion connected to the first support portion. The support element is bended to extend from the top wall toward the outside of the accommodating space. An opening is formed on the top wall. The first support portion is disposed on the system frame. The display panel is disposed on the panel frame. The printed circuit board is disposed on the second support portion.

In the aforementioned embodiments of the present invention, the first support portion and the second support portion of the support element are connected with each other. The support element extends from the edge of the baseplate toward the outside of the accommodating space, or is bended to extend from the top wall toward the outside of the accommodating space. When the panel frame is used, the first support portion of the support element can be disposed on the system frame, and the printed circuit board can be disposed on the second support portion of the support element. Furthermore, during the manufacture of the panel frame, the process time for punching and bending the first support portion and the second support portion can be reduced. In addition, since the first support portion is connected to the second support portion, only a single opening corresponding to one support element is formed on the baseplate or on the top wall, such that the number of the openings of the panel frame can be decreased. When the display panel is assembled to the panel frame, the panel frame does not easily suffer deformation caused by external forces. As a result, the display panel located on the panel frame is not easily broken.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
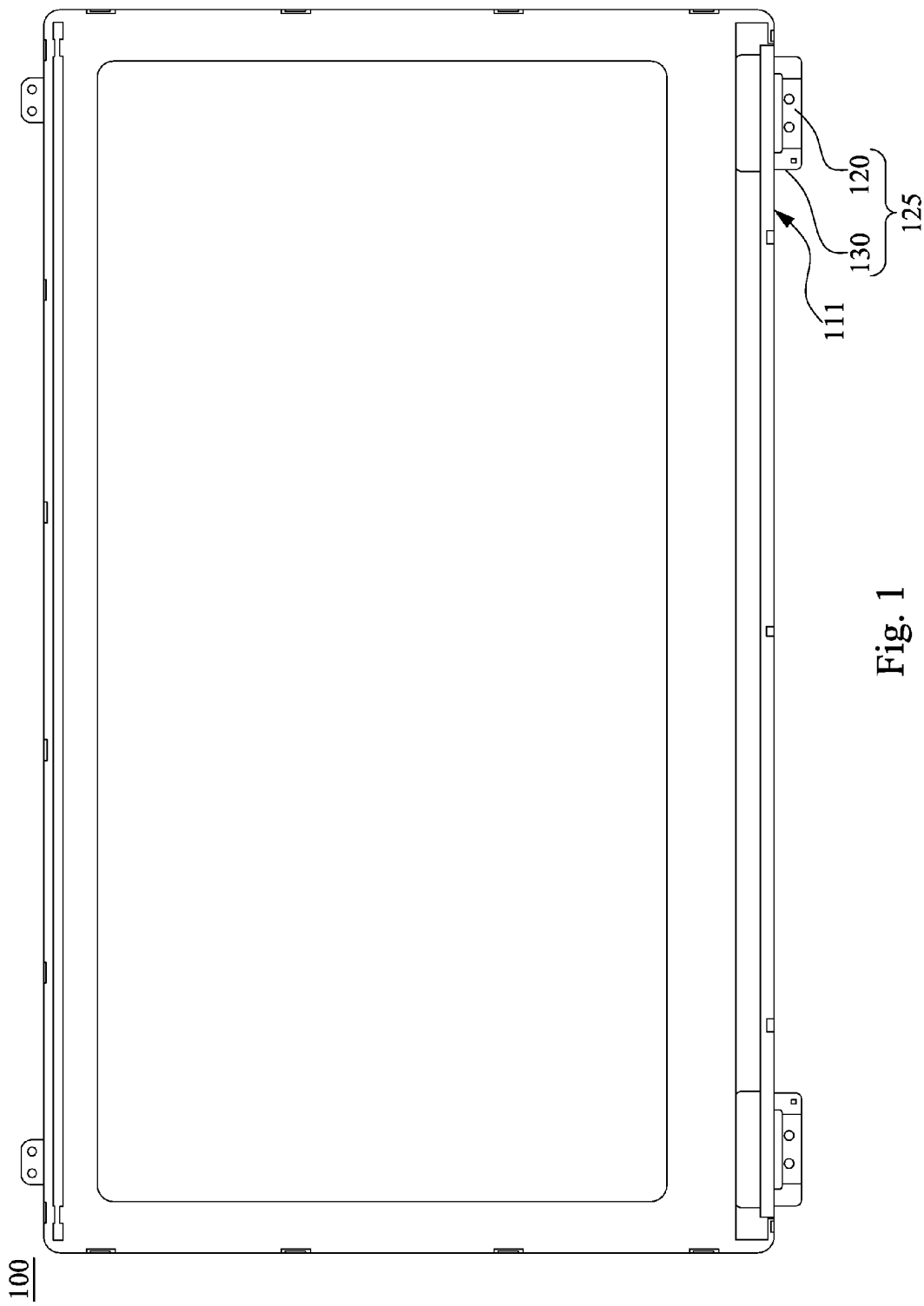
FIG. 1 is a top view of a panel frame according to an embodiment of the present invention.
Figure 2:
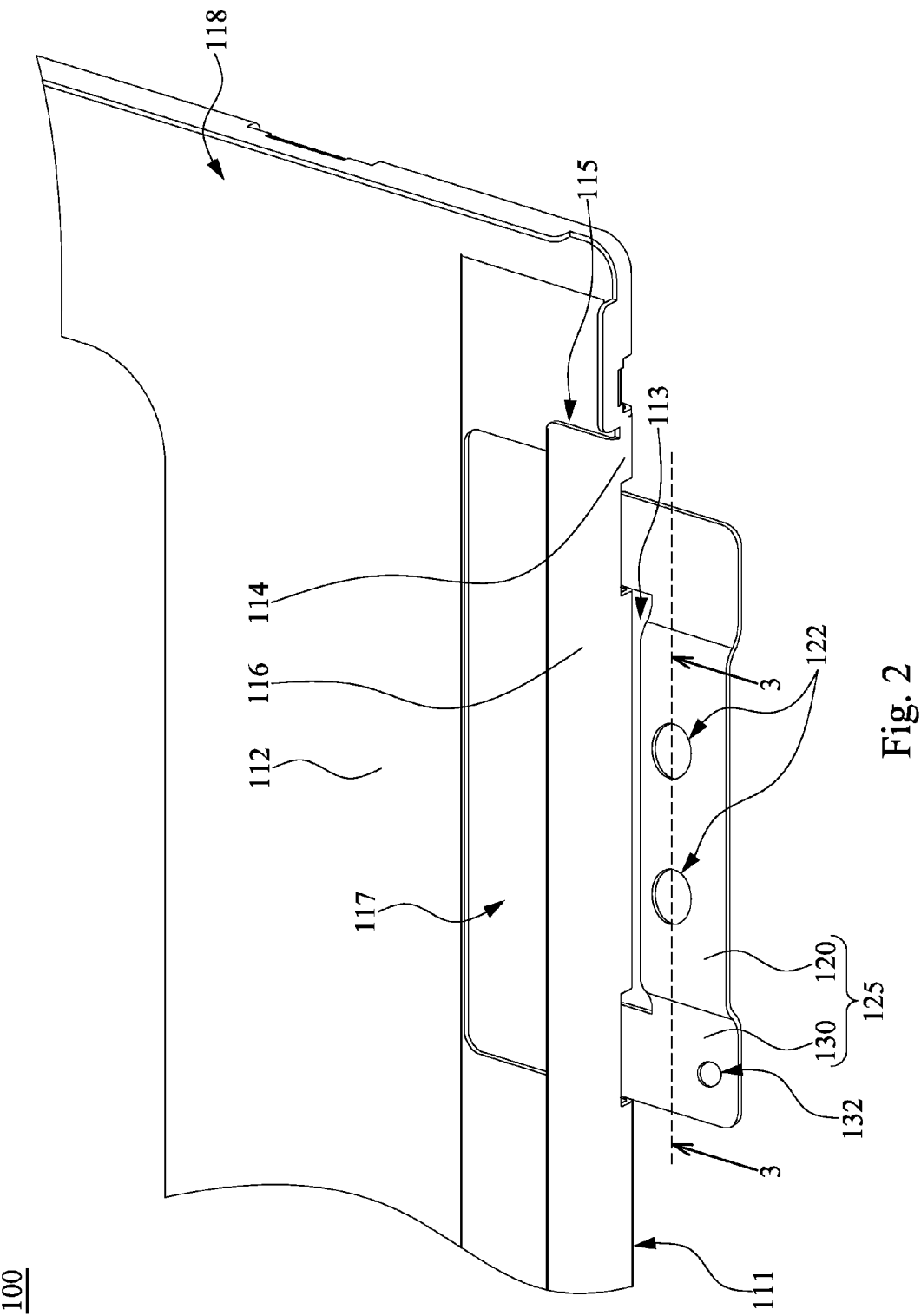
FIG. 2 is a partial perspective view of the panel frame shown in FIG. 1.

FIG. 1 is a top view of a panel frame 100 according to an embodiment of the present invention. FIG. 2 is a partial perspective view of the panel frame 100 shown in FIG. 1. As shown in FIG. 1 and FIG. 2, the panel frame 100 includes a baseplate 112, a sidewall 114 that is located on the baseplate 112, a top wall 116, and a support element 125. The support element 125, the baseplate 112, the sidewall 114, and the top wall 116 are integrally formed as a single piece. The baseplate 112 has an edge 111. The sidewall 114 is located on the edge 111 of the baseplate 112, and an accommodating space 118 is formed by the sidewall 114 and the baseplate 112. The top wall 116 is connected to the sidewall 114 and above the baseplate 112, and a groove 115 is formed between the top wall 116, the sidewall 114, and the baseplate 112. The support element 125 extends from the edge 111 of the baseplate 112 toward the outside of the accommodating space 118, and includes a first support portion 120 and a second support portion 130 connected to the first support portion 120.

The panel frame 100 can be used to support a liquid crystal panel, a light guide plate, and an optical film, etc. For example, the top wall 116 is used to support a display panel, and the groove 115 is used to position the light guide plate, but the groove 115 is not limited to position the light guide plate, for example, the optical film may also be positioned in the groove 115. The first support portion 120 can be positioned on a frame body (e.g., a system frame) by engaging with a screw. The second support portion 130 can be used to support and position a printed circuit board, such that the second support portion 130 is located between the frame body (e.g., a system frame) and the printed circuit board. Moreover, the support element 125 of the panel frame 100 may be formed by punching and bending.

In this embodiment, the support element 125 is bended from the edge 111 of the baseplate 112 toward the outside of the accommodating space 118, such that an opening 117 is formed on the baseplate 112. In other words, the baseplate 112 has the opening 117. The support element 125 is connected to the sidewall 114 by the second support portion 130. The support element 125 is folded from an edge of the opening 117 and extends toward outside of the accommodating space 118. Moreover, the support element 125 is folded to outside of the sidewall 114, and the second support portion 130 is physically connected to the sidewall 114. Another opening 113 is formed between the sidewall 114 and the first support portion 120. After the support element 125 is bended from the baseplate 112, the opening 113 is surrounded by the baseplate 112, the first support portion 120, and the second support portion 130. Moreover, the second support portion 130 may be perpendicular to the edge 111 of the baseplate 112, but the present invention is not limited in this regard.

In addition, the first support portion 120 has a first connection portion 122, and the second support portion 130 has a second connection portion 132. The first connection portion 122 of the first support portion 120 can be connected to a frame body (e.g., a system frame). For example, the first connection portion 122 is a through hole, such that a screw can pass through the first connection portion 122, and the first support portion 120 can be disposed on the frame body. The second connection portion 132 of the second support portion 130 can be connected to a printed circuit board. For example, the second connection portion 132 is another through hole, such that another screw can pass through the second connection portion 132, and the printed circuit board can be disposed on the second support portion 130. The number of the first connection portions 122 and the number of the second connection portions 132 may be decided by designers as they deem necessary, and the present invention is not limited in this regard.

Since the first support portion 120 and the second support portion 130 of the support element 125 are connected with each other, and the support element 125 extends from the edge 111 of the baseplate 112 toward the outside of the accommodating space 118, when the panel frame 100 is used, the first support portion 120 can be disposed on a frame body, and a printed circuit board can be disposed on the second support portion 130. Furthermore, during the manufacture of the panel frame 100, the process time for punching and bending the first support portion 120 and the second support portion 130 can be reduced. Since the first support portion 120 is connected to the second support portion 130, only a single opening 117 corresponding to one support element 125 is formed on the baseplate 112, and the sidewall 114 and the top wall 116 do not form other openings. As a result, when a display panel is disposed on the top wall 116, the display panel is steady and is not easily broken.

Figure 3:
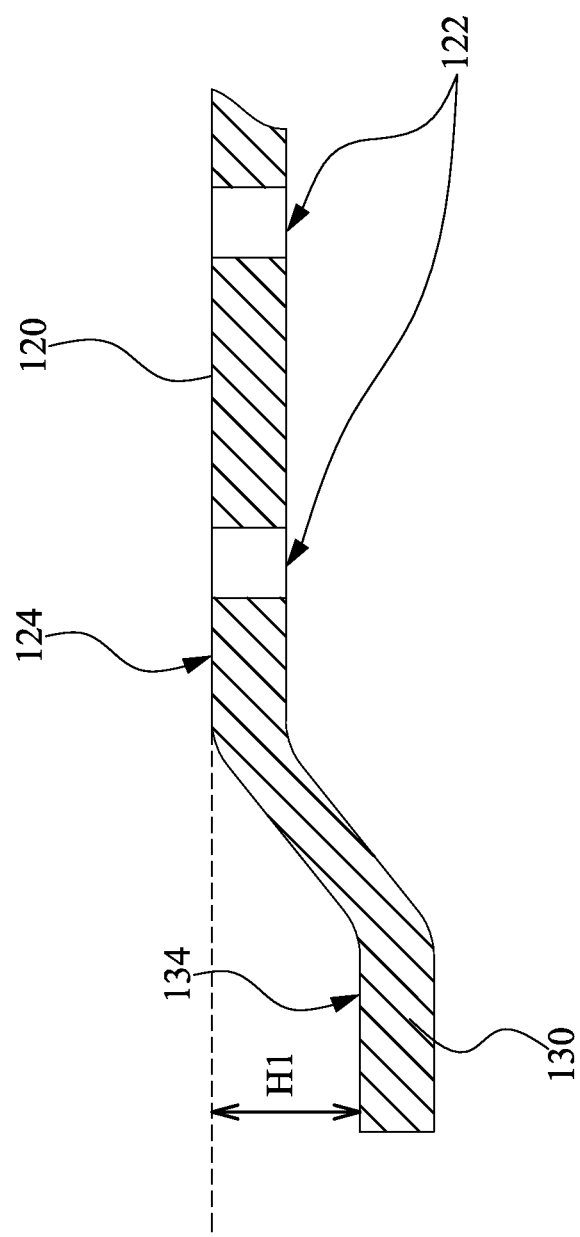
FIG. 3 is a cross-sectional view of FIG. 2 taken along line 3-3.

FIG. 3 is a cross-sectional view of FIG. 2 taken along line 3-3. As shown in FIG. 3, a vertical height difference H1 is formed between the top surface 124 of the first support portion 120 and the top surface 134 of the second support portion 130. When a printed circuit board is located on the second support portion 130, the vertical height difference H1 can prevent the top surface of the printed circuit board from being higher than the top surface 124 of the first support portion 120 to affect assembly. In this embodiment, the vertical height difference H1 is in a range from 0.5 to 1 mm, but the present invention is not limited in the range, and the vertical height difference H1 may be decided by designers as they deem necessary.

Figure 4:
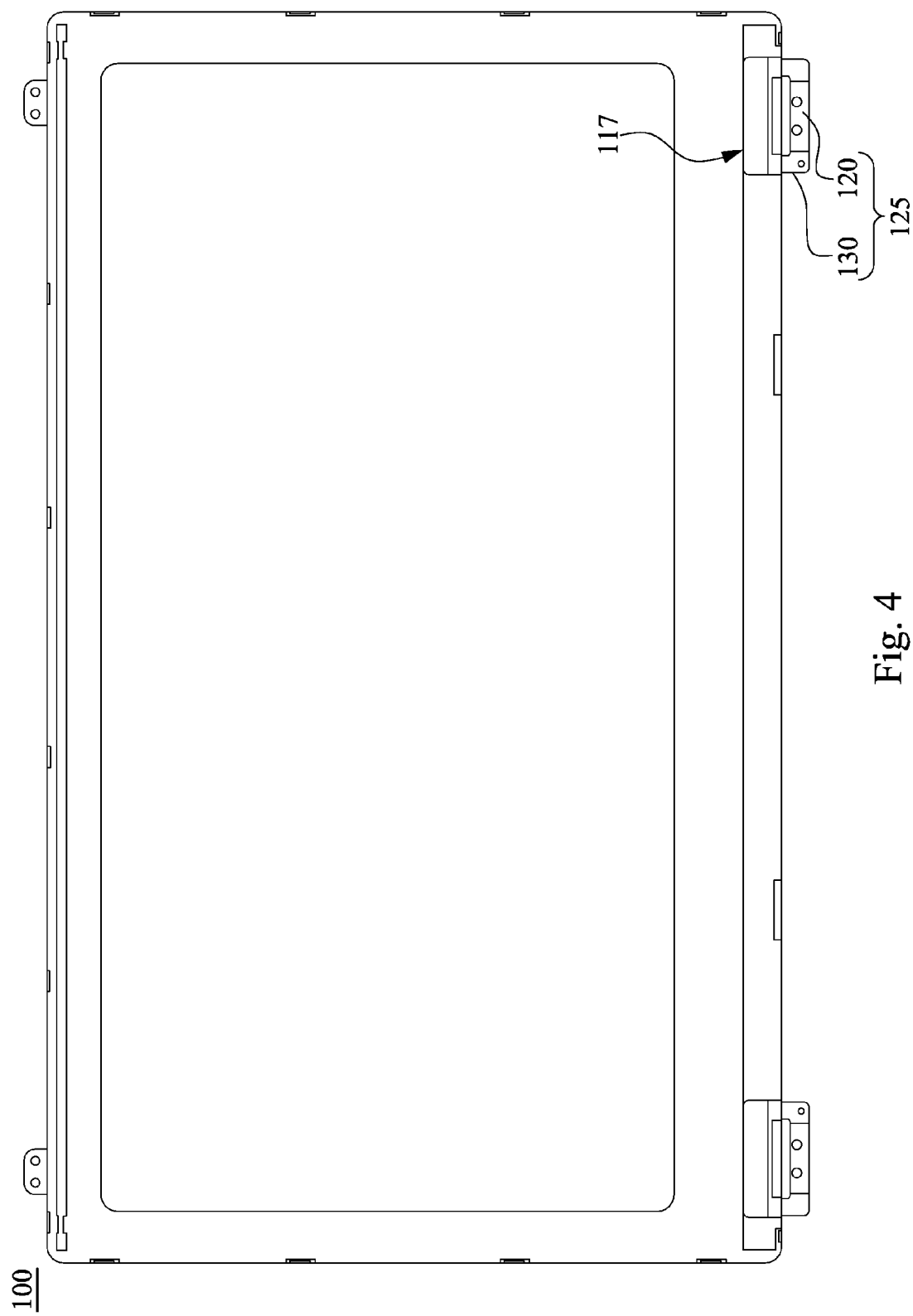
FIG. 4 is a bottom view of the panel frame shown in FIG. 1.
Figure 5:
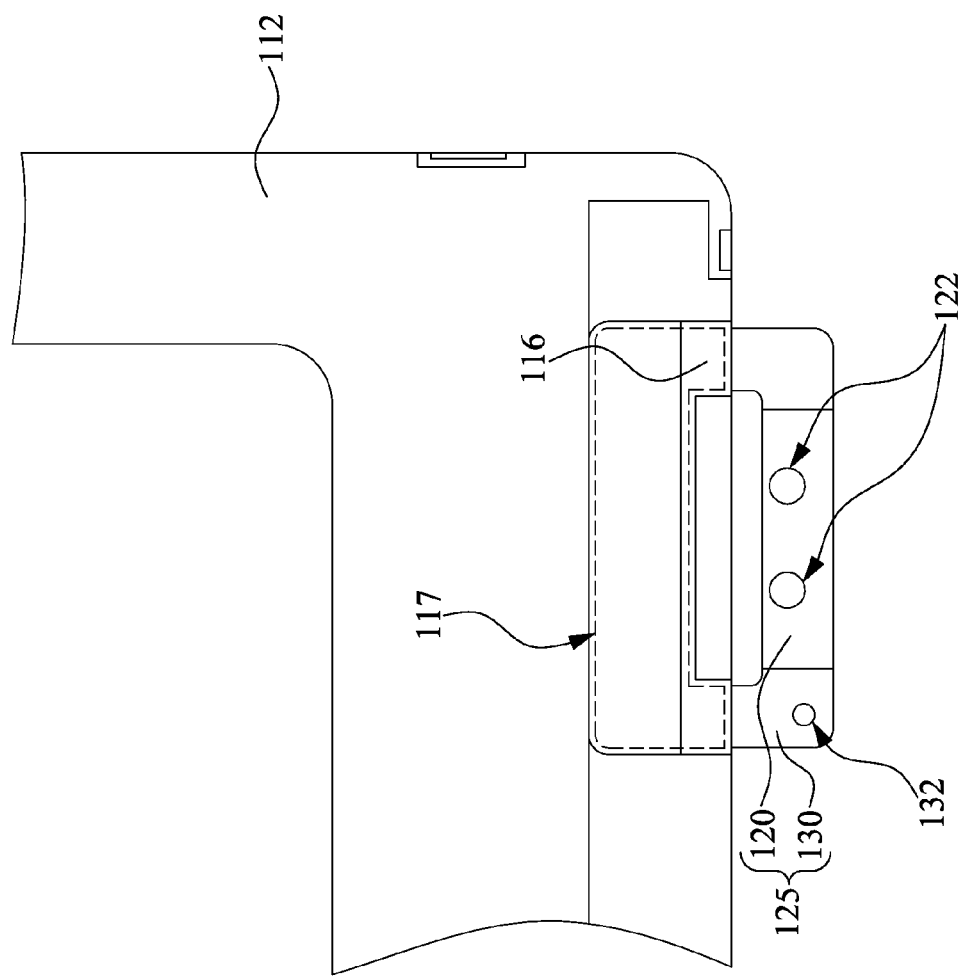
FIG. 5 is a partial enlarged view of the panel frame shown in FIG. 4.

FIG. 4 is a bottom view of the panel frame 100 shown in FIG. 1. FIG. 5 is a partial enlarged view of the panel frame 100 shown in FIG. 4. As shown in FIG. 4 and FIG. 5, before bending the support element 125 from the baseplate 112, the support element 125 is a portion of the baseplate 112 and is located in the position of the opening 117 (i.e., the region within dotted lines in FIG. 5). That is to say, the first support portion 120 and the second support portion 130 are bended outward from the opening 117, so that the area of the support element 125 is smaller or equal to the area of the opening 117. In other words, the outline of the support element 125 is substantially the same as that of the opening 117.

In the following description, the forming processes of the top wall 116 and the support element 125 will be described.

Figure 6:
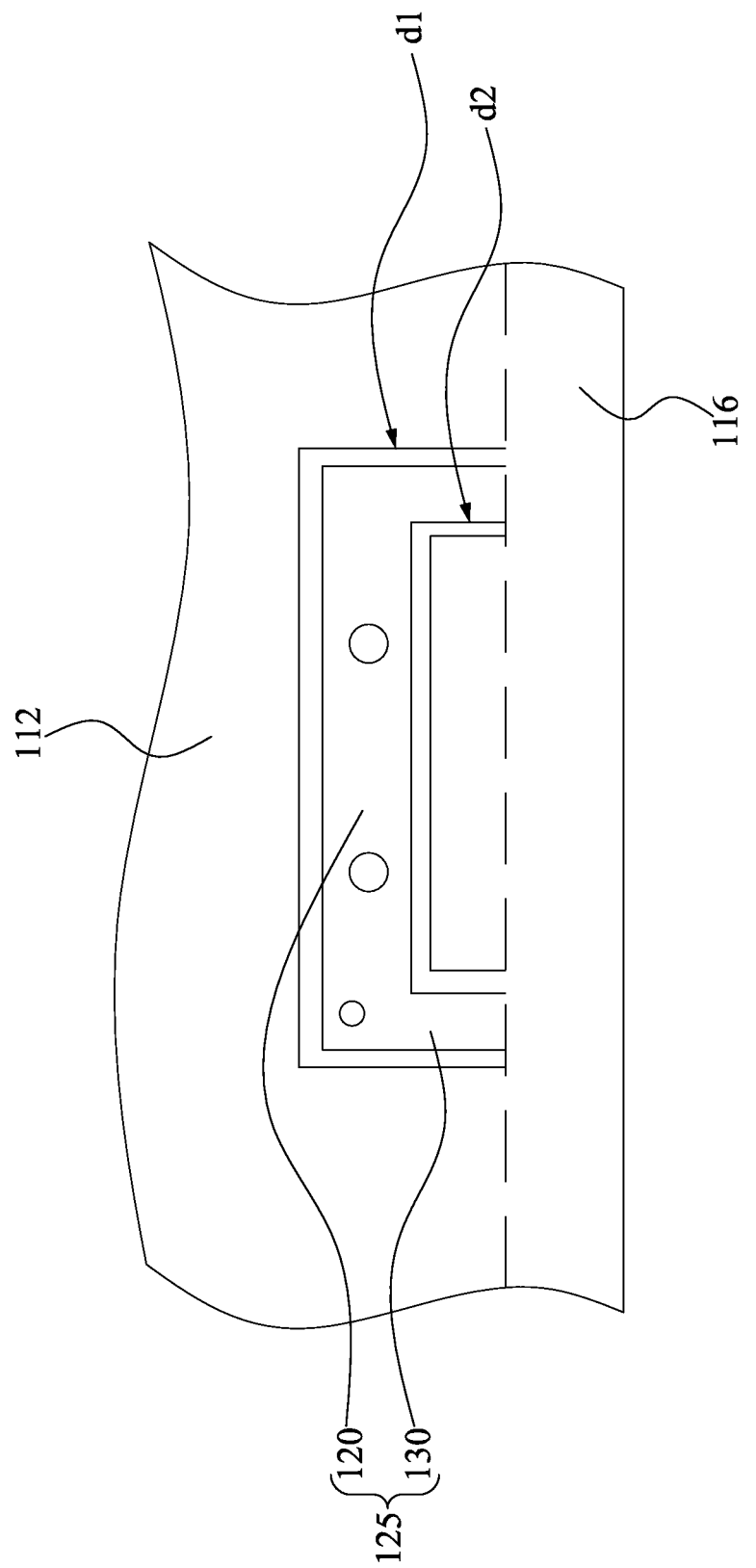
FIG. 6 is a top view of a support element shown in FIG. 2 before being bended to extend from an opening.

FIG. 6 is a top view of the support element 125 shown in FIG. 2 before being bended to extend from the opening 117 (see FIG. 2). Before bending the top wall 116, the first support portion 120, and the second support portion 130, the top wall 116, the first support portion 120, and the second support portion 130 are portions of the baseplate 112. During the manufacture of the support element 125, gaps d1, d2 can be formed on the baseplate 112 by a cutter, and a board portion between the gaps d1, d2 is the support element 125. Although the gaps d1, d2 formed by cutting are shown in FIG. 6, the gaps d1, d2 may approach to zero, and the size of the gaps d1, d2 depend on the thickness of the cutter. After cutting the baseplate 112, the top wall 116 can be bended along the dotted lines shown in FIG. 6 toward the upper surface of the baseplate 112, and the top wall 116 shown in FIG. 7 is realized.

Figure 7:
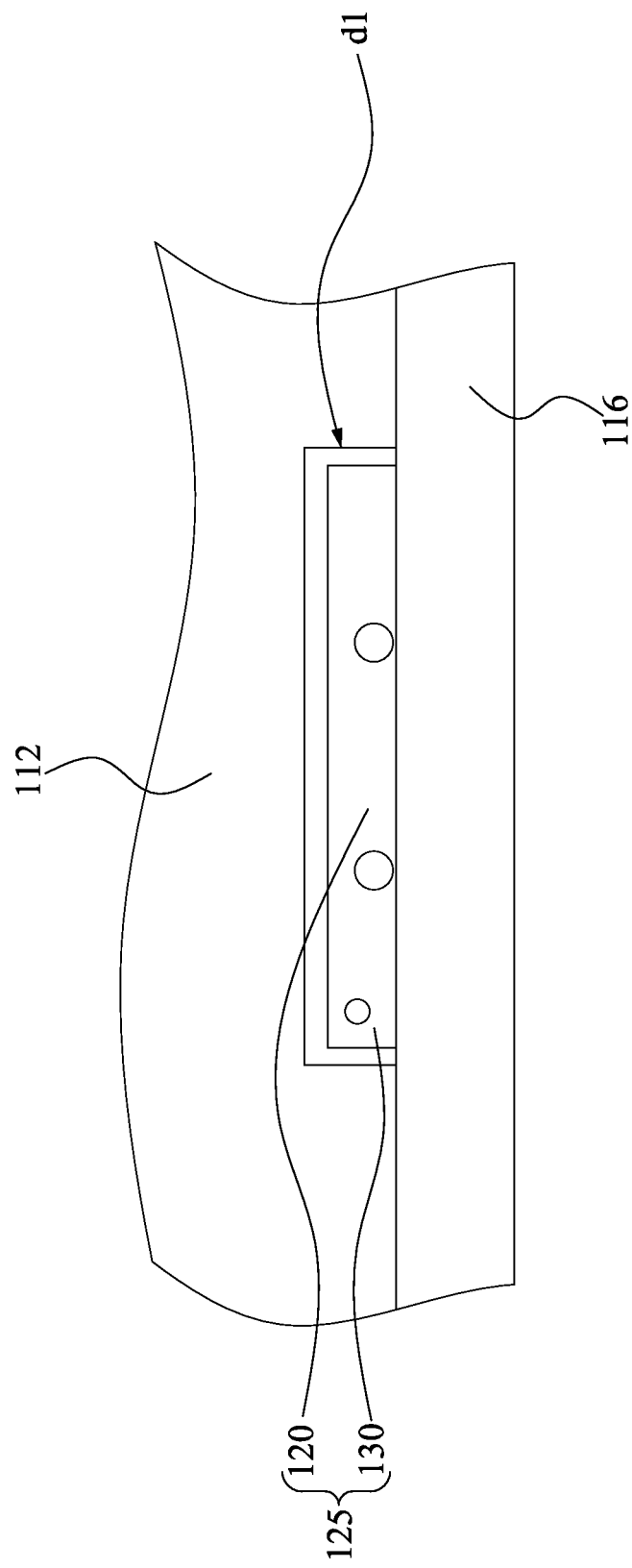
FIG. 7 is a top view of a top wall shown in FIG. 6 after being bended.

FIG. 7 is a top view of the top wall 116 shown in FIG. 6 after being bended. As shown in FIG. 6 and FIG. 7, after the top wall 116 is bended, the support element 125 located between the gaps d1, d2 can be bended toward the bottom surface of the baseplate 112. That is to say, the bending direction of the top wall 116 is opposite to the bending direction of the support element 125. As a result, the support element 125 can extend from the baseplate 112, and the support element 125 shown in FIG. 1 is realized.

Figure 8:
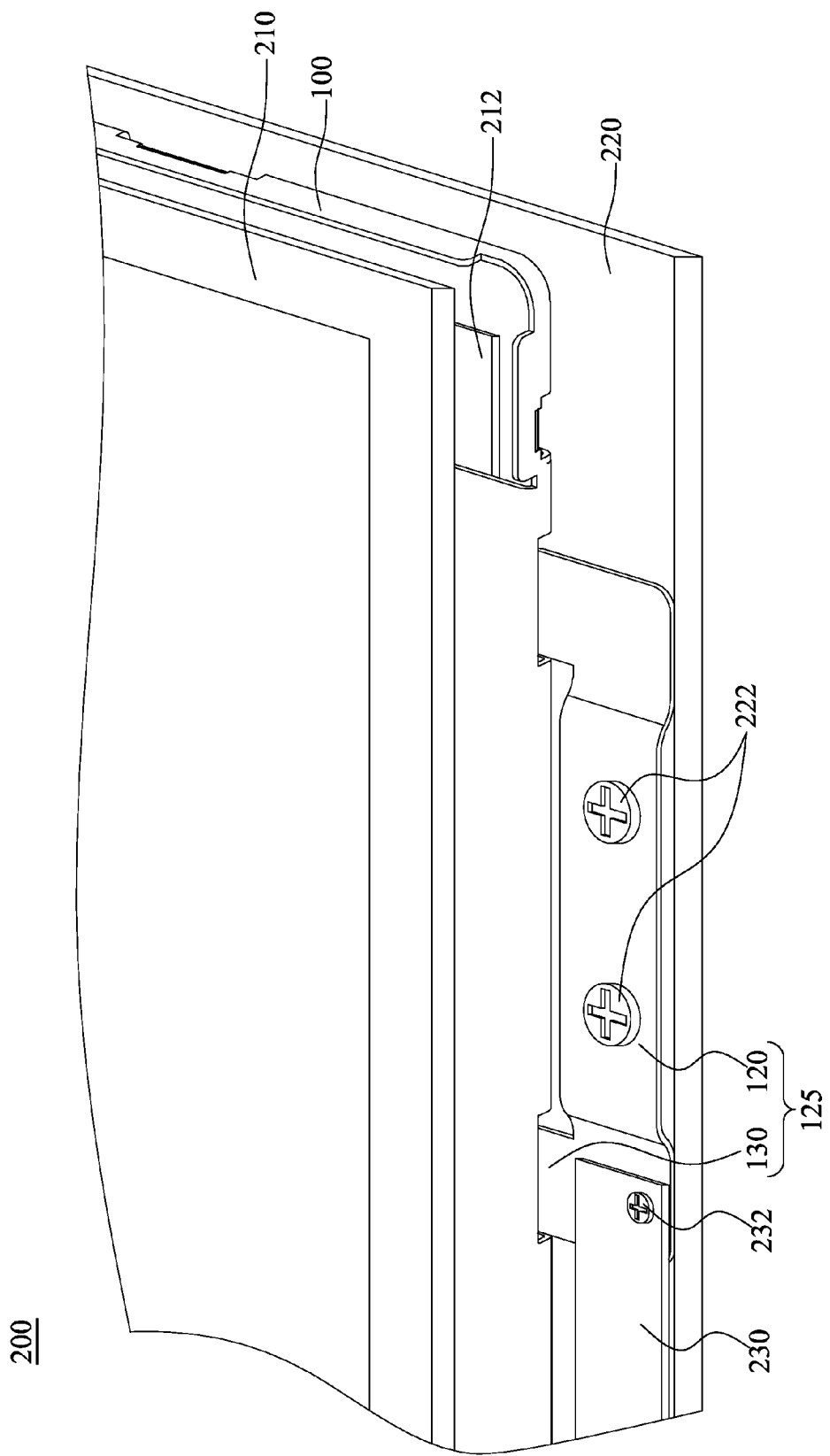
FIG. 8 is a partial perspective view of a display module according to an embodiment of the present invention.

FIG. 8 is a partial perspective view of a display module 200 according to an embodiment of the present invention. As shown in FIG. 2 and FIG. 8, the display module 200 includes a display panel 210, a system frame 220, a printed circuit board 230, and the aforesaid panel frame 100. The panel frame 100 includes the baseplate 112, the sidewall 114, the top wall 116, and the support element 125. The first support portion 120 of the support element 125 is used to match with the system frame 220, and the second support portion 130 of the support element 125 is used to match with the printed circuit board 230. The display panel 210 is disposed on the panel frame 100. The second support portion 130 is located between the system frame 220 and the printed circuit board 230 and has the second connection portion 132 that is connected to the printed circuit board 230. The first support portion 120 of the support element 125 of the panel frame 100 is disposed on the system frame 220, and the printed circuit board 230 is disposed on the second support portion 130 of the support element 125 of the panel frame 100, such that the system frame 220 and the printed circuit board 230 are respectively located on two opposite sides of the support element 125.

In this embodiment, the display panel 210 is adhered to the top wall 116 of the panel frame 100. A screw 222 passes through the first connection portion 122 of the first support portion 120, such that the first support portion 120 can be disposed on the system frame 220. A screw 232 passes through the printed circuit board 230 and the second connection portion 132 of the second support portion 130, such that the printed circuit board 230 can be disposed on the second support portion 130. Moreover, the display module 200 may further include a light guide plate 212 or other optical films, and the light guide plate 212 or other optical films can be disposed on the groove 115 formed between the top wall 116 and the baseplate 112.

It is to be noted that the elements and the connection relationships thereof described above will not be repeated in the following description, and only aspects related to another type of the support element 125 will be explained.

Figure 9:
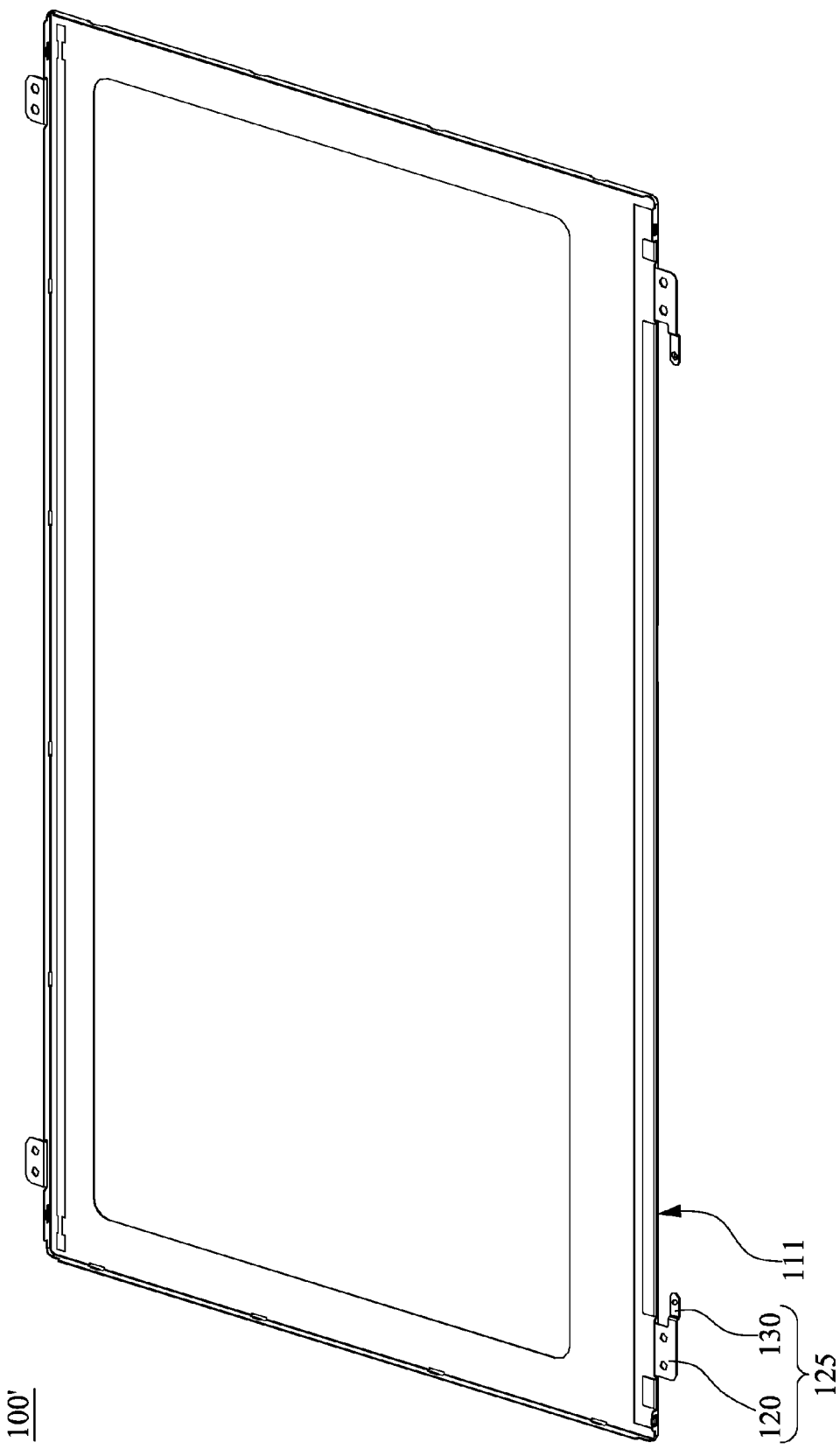
FIG. 9 is a perspective view of a panel frame according to an embodiment of the present invention.
Figure 10:
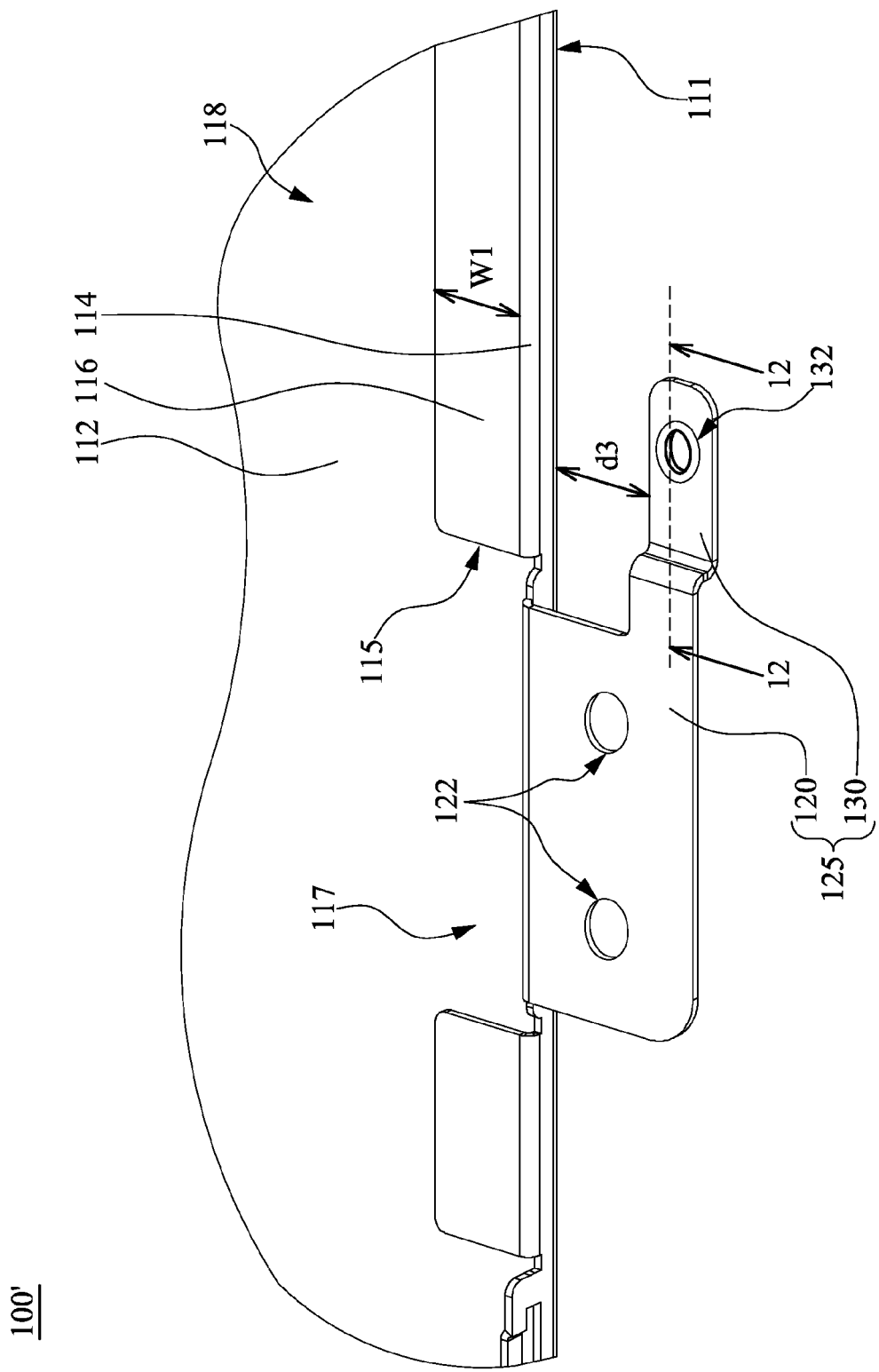
FIG. 10 is a partial enlarged view of the panel frame shown in FIG. 9.

FIG. 9 is a perspective view of a panel frame 100' according to an embodiment of the present invention. FIG. 10 is a partial enlarged view of the panel frame 100' shown in FIG. 9. As shown in FIG. 9 and FIG. 10, the panel frame 100' includes the baseplate 112, the sidewall 114 that is located on the baseplate 112, the top wall 116, and the support element 125. The support element 125, the baseplate 112, the sidewall 114, and the top wall 116 are integrally formed as a single piece. The support element 125 includes the first support portion 120 and the second support portion 130 connected to the first support portion 120. The groove 115 is formed between the top wall 116, the sidewall 114, and the baseplate 112. The difference between this embodiment and the embodiment shown in FIG. 2 is that the support element 125 is bended to extend from the top wall 116 toward the outside of the accommodating space 118, and the opening 117 is formed on the top wall 116. In other words, the support element 125 is folded to extend from an edge of the opening 117 and extends toward outside of the groove 115. The top wall 116 has the opening 117 and is connected to the sidewall 114 and above the baseplate 112. The width of the first support portion 120 is substantially equal to the width of the opening 117 of the top wall 116. In addition, the support element 125 is folded to outside of the sidewall 114, and the first support portion 120 is physically connected to the sidewall 114, and the second support portion 130 is parallel to the edge 111 of the baseplate 112, such that a gap d3 is formed between the sidewall 114 and the second support portion 130.

In this embodiment, the bending direction of the first support portion 120 at the sidewall 114 is opposite to the bending direction of top wall 116 at the sidewall 114. The opening 117 can selectively pass through at least a portion of the sidewall 114. For example, the sidewall 114 between the first support portion 120 and the top wall 116 may have a concave portion as deemed necessary by designers.

Furthermore, the first support portion 120 has a first connection portion 122, and the second support portion 130 has a second connection portion 132. In use, the first connection portion 122 can be connected to a frame body (e.g., a system frame). For example, the first connection portion 122 is a through hole, such that a screw can pass through the first connection portion 122, and the first support portion 120 can be disposed on the frame body. The second connection portion 132 can be connected to a printed circuit board. For example, the second connection portion 132 is another through hole, such that another screw can pass through the second connection portion 132, and the printed circuit board can be disposed on the second support portion 130. As a result, the system frame and the printed circuit board can be respectively located on two opposite sided of the support element 125.

In this embodiment, the top wall 116 has a width W1. Since the second support portion 130 is parallel to the edge 111 of the baseplate 112, a distance (i.e., the gap d3) is formed between the second support portion 130 and the edge 111 of the baseplate 112.

Figure 11:
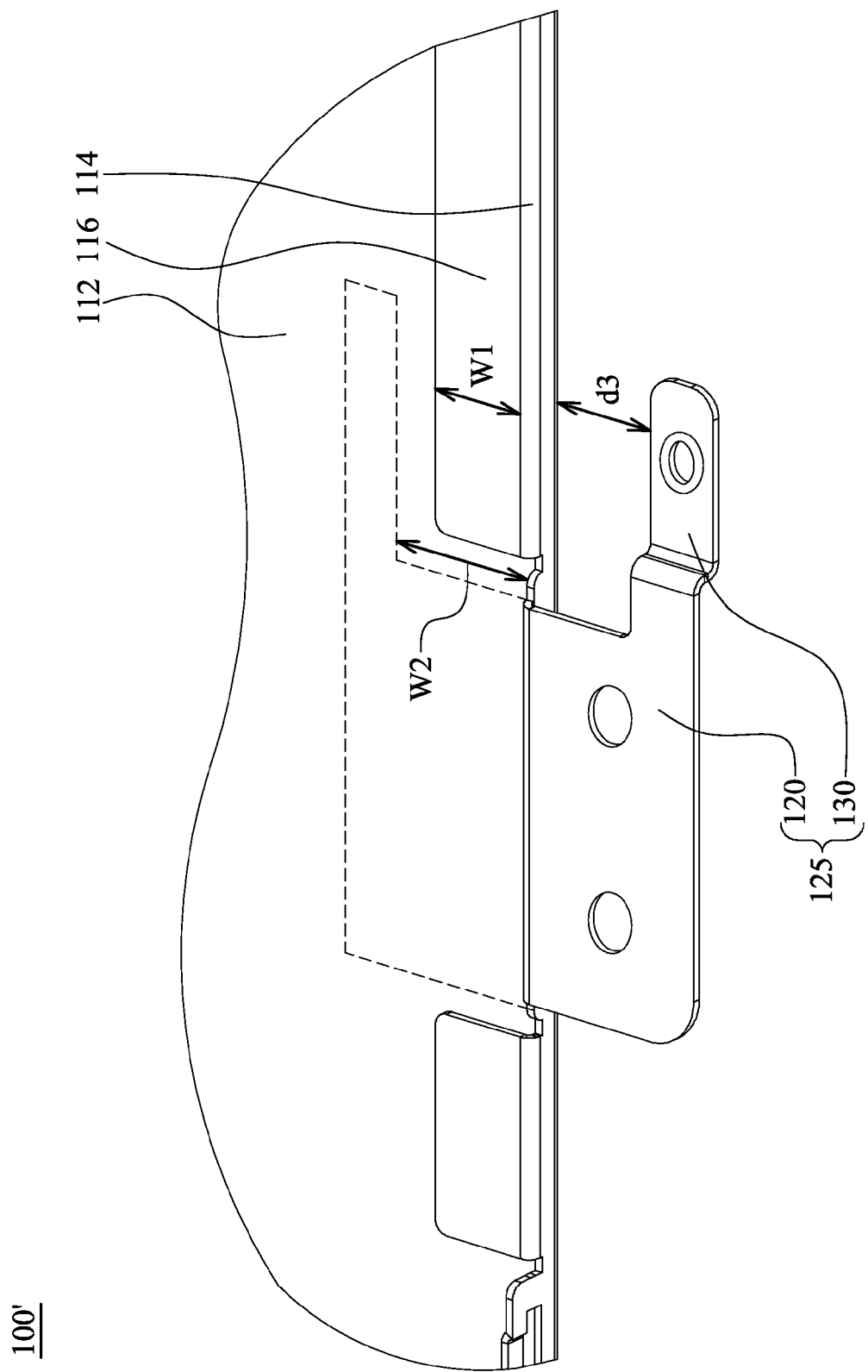
FIG. 11 is a partial enlarged view of the panel frame shown in FIG. 9.

FIG. 11 is a partial enlarged view of the panel frame 100' shown in FIG. 9. As shown in FIG. 10 and FIG. 11, the support element 125 is connected to the top wall 116 before being cut. After being cut and before being bended, the first support portion 120 and the second support portion 130 are located in the region within dotted lines, and a distance W2 is greater than or equal to the width W1. Thereafter, the first support portion 120 is bended in a direction away from the bending direction of the top wall 116, such that the first support portion 120 extends from the baseplate 112. Since the first support portion 120 is formed by bending, the distance W2 is substantially equal to the gap d3. The support element 125 is cut and bended from the top wall 116, so that the width W1 of the top wall 116 greater than the distance W2 is impossible. That is to say, the width W1 of the top wall 116 is smaller than or equal to the distance (i.e., the gap d3) between the second support portion 130 and the edge 111 of the baseplate 112.

Since the first support portion 120 and the second support portion 130 of the panel frame 100' are connected with each other, the process time of the panel frame 100' for punching and bending the first support portion 120 and the second support portion 130 can be reduced. Moreover, only a single opening 117 corresponding to one support element 125 is formed on the top wall 116, and the sidewall 114 and the top wall 116 do not form other openings. As a result, the panel frame 100' does not easily deformed by external forces, and a display panel disposed thereon is not easily broken.

Figure 12:
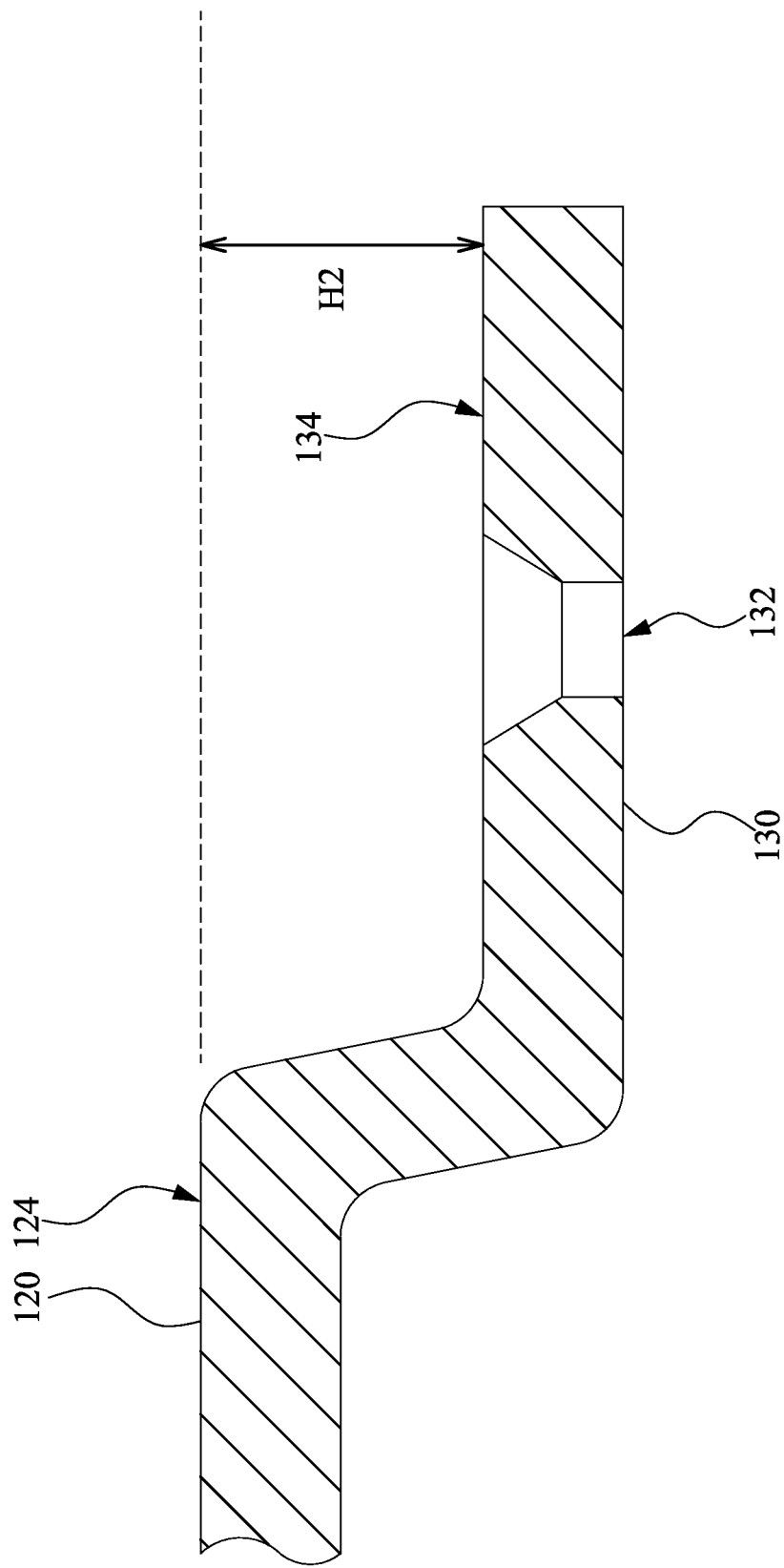
FIG. 12 is a cross-sectional view of FIG. 10 taken along line 12-12.

FIG. 12 is a cross-sectional view of FIG. 10 taken along line 12-12. As shown in FIG. 12, a vertical height difference H2 is formed between the top surface 124 of the first support portion 120 and the top surface 134 of the second support portion 130. When a printed circuit board is located on the second support portion 130, the vertical height difference H2 can prevent the top surface of the printed circuit board from being higher than the top surface 124 of the first support portion 120 to affect assembly. In this embodiment, the vertical height difference H2 is in a range from 0.5 to 1 mm, but the present invention is not limited in the range, and the vertical height difference H2 may be decided by designers as they deem necessary.

Figure 13:
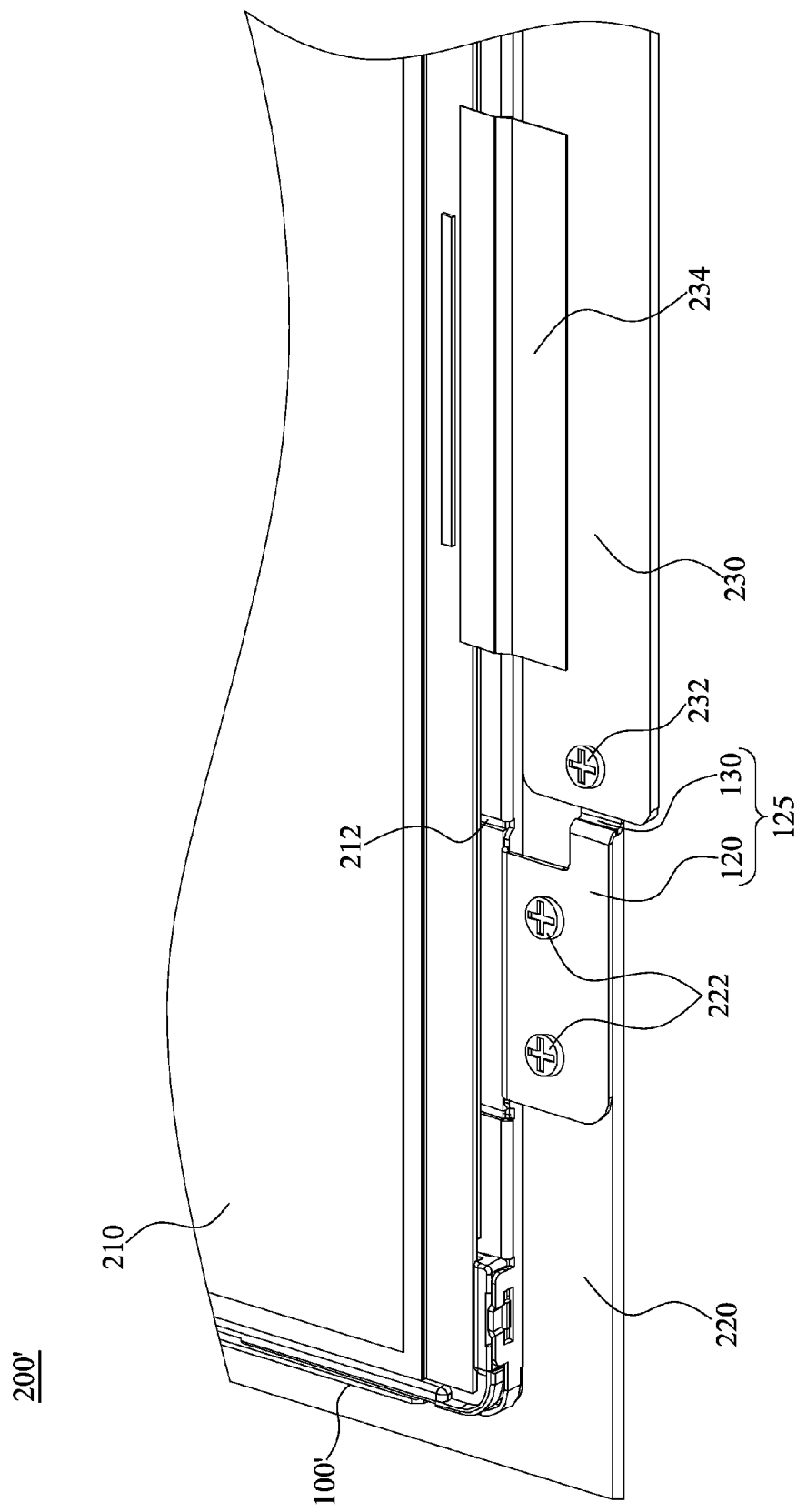
FIG. 13 is a partial perspective view of a display module according to an embodiment of the present invention.

FIG. 13 is a partial perspective view of a display module 200' according to an embodiment of the present invention. As shown in FIG. 10 and FIG. 13, the display module 200' includes the display panel 210, the system frame 220, the printed circuit board 230, and the aforesaid panel frame 100'. The panel frame 100' includes the baseplate 112, the sidewall 114, the top wall 116, and the support element 125. The first support portion 120 of the support element 125 is used to match with the system frame 220, and the second support portion 130 of the support element 125 is used to match with the printed circuit board 230. The display panel 210 is disposed on the panel frame 100'. The second support portion 130 is located between the system frame 220 and the printed circuit board 230. The first support portion 120 of the support element 125 of the panel frame 100' is disposed on the system frame 220, and the printed circuit board 230 is disposed on the second support portion 130 of the support element 125 of the panel frame 100', such that the system frame 220 and the printed circuit board 230 are respectively located on two opposite sides of the support element 125.

In this embodiment, the display panel 210 is electrically connected to the printed circuit board 230 by a flexible printed circuit (FPC) board 234. The display panel 210 is adhered to the top wall 116 of the panel frame 100'. The screw 222 passes through the first connection portion 122 of the first support portion 120, such that the first support portion 120 can be disposed on the system frame 220. The screw 232 passes through the printed circuit board 230 and the second connection portion 132 of the second support portion 130, such that the printed circuit board 230 can be disposed on the second support portion 130. Moreover, the display module 200 may further include the light guide plate 212 or other optical films, and the light guide plate 212 or other optical films can be disposed on the groove 115 formed between the top wall 116 and the baseplate 112.

In the aforementioned embodiments of the present invention, the first support portion and the second support portion of the support element of the display module are connected with each other. The support element extends from the edge of the baseplate toward the outside of the accommodating space, or is bended to extend from the top wall toward the outside of the accommodating space. When the panel frame is used, the first support portion of the support element can be disposed on the system frame, and the printed circuit board can be disposed on the second support portion of the support element. Furthermore, during the manufacture of the panel frame, the process time for punching and bending the first support portion and the second support portion can be reduced. In addition, since the first support portion is connected to the second support portion, only a single opening is formed on the baseplate or on the top wall and corresponds to one support element, such that the number of the openings of the panel frame can be decreased. When the display panel is assembled to the panel frame, the panel frame does not easily suffer deformation caused by external forces. As a result, the display panel located on the panel frame is not easily broken.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A display module comprising:
    a system frame;
    a panel frame comprising:
        a baseplate having an opening;
        at least one sidewall located on the baseplate, wherein an accommodating space is formed by the sidewall and the baseplate;
        at least one top wall connected to the sidewall and above the baseplate; and
        a support element comprising a first support portion and a second support portion connected to the first support portion, wherein the support element is folded from an edge of the opening and extends toward outside of the accommodating space; the support element, the baseplate, the sidewall, and the top wall are integrally formed as a single piece; an outline of the support element is substantially the same as that of the opening; the first support portion is for matching with the system frame, and the second support portion is for matching with a printed circuit board; and
    a display panel disposed on the panel frame.

2. The display module of claim 1, wherein the support element is folded to outside of the sidewall, and the second support portion is physically connected to the sidewall, and another opening is formed between the sidewall and the first support portion.

3. The display module of claim 1, comprising a groove that is formed between the top wall, the sidewall, and the baseplate.

4. The display module of claim 1, wherein a vertical height difference is formed between the first support portion and the second support portion.

5. The display module of claim 4, wherein the vertical height difference is in a range from 0.5 to 1 mm.

6. The display module of claim 1, wherein the first support portion has a first connection portion connected to the system frame.

7. The display module of claim 1, wherein the second support portion has a second connection portion connected to the printed circuit board.

8. A display module comprising:
a system frame;
a panel frame comprising:
  a baseplate;
  at least one sidewall located on the baseplate, wherein an accommodating space is formed by the sidewall and the baseplate;
  at least one top wall having an opening and connected to the sidewall and above the baseplate, wherein a groove is formed between the top wall, the sidewall, and the baseplate; and
  a support element comprising a first support portion and a second support portion connected to the first support portion, wherein the support element is folded to extend from an edge of the opening and extends toward outside of the accommodating space; the first support portion is physically connected to the sidewall, and the second portion is physically connected to the first support portion and is indirectly connected to the sidewall through the first support portion; the support element, the baseplate, the sidewall, and the top wall are integrally formed as a single piece; the first support portion is for matching with the system frame, and the second support portion is for matching with a printed circuit board; and
a display panel disposed on the panel frame.

9. The display module of claim 8, wherein the support element is folded to outside of the sidewall, and the first support portion is physically connected to the sidewall, and a gap is formed between the sidewall and the second support portion.

10. The display module of claim 8, wherein the opening passes through at least a portion of the sidewall.

11. The display module of claim 8, wherein a width of the top wall is smaller than or equal to a distance between the second support portion and the edge of the baseplate.

12. The display module of claim 8, wherein a vertical height difference is formed between the first support portion and the second support portion.

13. The display module of claim 12, wherein the vertical height difference is in a range from 0.5 to 1 mm.

14. The display module of claim 8, wherein the first support portion has at least one first connection portion connected to the system frame.

15. The display module of claim 8, wherein the second support portion has a second connection portion connected to the printed circuit board.

16. The display module of claim 8, wherein the width of the first support portion is substantially equal to the width of the opening of the top wall.

* * * * *